US008341944B2

(12) United States Patent
Walde et al.

(10) Patent No.: US 8,341,944 B2
(45) Date of Patent: Jan. 1, 2013

(54) METHOD FOR ADJUSTING THE METERED QUANTITY OF REDUCING AGENT FOR SELECTIVE CATALYTIC REDUCTION

(75) Inventors: Florian Walde, Dietenhofen (DE); Andreas Döring, München (DE)

(73) Assignee: MAN Nutzfahzeuge AG, Munich (DE)

( * ) Notice: Subject to any disclaimer, the term of this patent is extended or adjusted under 35 U.S.C. 154(b) by 352 days.

(21) Appl. No.: 12/719,308

(22) Filed: Mar. 8, 2010

(65) Prior Publication Data
US 2010/0223907 A1  Sep. 9, 2010

(30) Foreign Application Priority Data
Mar. 6, 2009  (DE) .......................... 10 2009 012 092

(51) Int. Cl.
F01N 3/00  (2006.01)
(52) U.S. Cl. .......................................... 60/295; 60/286
(58) Field of Classification Search ............ 60/295, 60/286
See application file for complete search history.

(56) References Cited

U.S. PATENT DOCUMENTS

| 6,092,367 | A | 7/2000 | Dolling |
| 6,119,448 | A | 9/2000 | Emmerling et al. |
| 2004/0159096 | A1 | 8/2004 | Yasui et al. |
| 2006/0130461 | A1* | 6/2006 | Gabrielsson et al. ........... 60/286 |
| 2006/0254260 | A1 | 11/2006 | Telford |
| 2008/0087009 | A1* | 4/2008 | Nishina et al. ................. 60/301 |
| 2008/0306673 | A1* | 12/2008 | Yasui et al. ..................... 701/102 |
| 2009/0025370 | A1* | 1/2009 | Kondo et al. .................... 60/286 |

FOREIGN PATENT DOCUMENTS

| DE | 34 28 232 | 2/1986 |
| DE | 43 15 278 | 11/1994 |
| DE | 195 36 571 | 4/1997 |
| DE | 199 06 344 | 8/2000 |
| DE | 101 00 420 | 1/2001 |
| EP | 898 061 | 2/1999 |
| FR | 2 816 986 | 5/2002 |
| FR | 2 880 071 | 6/2006 |
| FR | 2880071 A1 * | 6/2006 |
| JP | 63038154 | 2/1988 |
| JP | 9288084 | 4/1997 |
| JP | 10062374 | 3/1998 |

OTHER PUBLICATIONS

English translation of FR-2880071A1.*

* cited by examiner

Primary Examiner — Thomas Denion
Assistant Examiner — Jason Shanske
(74) Attorney, Agent, or Firm — Cozen O'Connor

(57) ABSTRACT

A method for application in conjunction with an exhaust gas post-treatment system for metering an ammonia-releasing reducing agent into the exhaust gas stream of an internal combustion engine installed in a motor vehicle and operated with excess air. A control unit meters the quantity of reducing agent as a function of a stored model and during the operation of the internal combustion engine varies the metered quantity during certain operating phases and compares the change in the measured value of at least one $NO_x$ sensor installed downstream of the SCR catalyst with an expected value.

13 Claims, 5 Drawing Sheets

METHOD FOR ADJUSTING THE METERED QUANTITY OF REDUCING AGENT FOR SELECTIVE CATALYTIC REDUCTION

BACKGROUND OF THE INVENTION

1. Field of the Invention

The invention is related to a method for metering an ammonia-releasing reducing agent into the exhaust gas stream of an internal combustion engine installed in a motor vehicle and operated with excess air, wherein a control unit meters the quantity of reducing agent as a function of a stored model and during the operation of the internal combustion engine varies the metered quantity during certain operating phases and compares the change in the measured value of at least one $NO_x$ sensor installed downstream of the SCR catalyst with an expected value.

2. Description of the Related Art

In addition to solid particles, nitrogen oxides belong to the legally restricted exhaust gas components that form during combustion processes. The permitted levels of these components is continually being lowered. Various methods are in use today to minimize these exhaust gas components in the internal combustion engines operated in motor vehicles. Lowering the levels of nitrogen oxides is usually done with the help of catalysts. To raise the selectivity and the $NO_x$ conversion rates, a reducing agent must also be present in the oxygen-rich exhaust gas.

These approaches have become known under the collective term "SCR method", where SCR stands for "selective catalytic reduction". They have been used for many years in the power plant industry and recently also in internal combustion engines. A detailed description of these methods can be found in DE 34 28 232 A1. $V_2O_5$-containing mixed oxides such as those in the form of $V_2O_5/WO_3/TiO_2$ can be used as SCR catalysts. The amounts of $V_2O_5$ present are typically in the range of 0.2-3%. The use of iron-containing and/or copper-containing zeolites is also conceivable.

Ammonia or compounds, which split off ammonia such as urea or ammonium formate in solid form or in the form of a solution, are used as reducing agents in practical applications.

Urea decomposes at high temperatures into isocyanic acid and ammonia:

$$(NH_2)_2CO \Leftrightarrow NH_3 + HNCO \quad (1)$$

The isocyanic acid is hydrolyzed by water in the exhaust gas to $NH_3$ and $CO_2$:

$$HNCO + H_2O \Rightarrow NH_3 + CO_2 \quad (2)$$

Upon complete hydrolysis of one mole of urea, therefore, two moles of ammonia and one mole of carbon dioxide are formed:

$$(NH_2)_2CO + H_2O \Rightarrow 2NH_3 + CO_2 \quad (3)$$

As a result, the hydrolysis of urea makes available the same reliable reducing agent used in the power plant industry, namely, ammonia.

One mole of ammonia is required to convert one mole of nitrogen monoxide:

$$4NO + 4NH_3 + O_2 \Rightarrow 4N_2 + 6H_2O \quad (4)$$

The ratio of $NH_3$ to $NO_x$ is called the feed ratio and respectively.

$$\alpha = NH_3/NO_x \quad (5)$$

In the case of an ideal catalyst, this means that, at a feed ratio of one, all of the nitrogen oxides are reduced; that is, a $NO_x$ conversion of 100% is achieved, because the following is true for $NO_x$ conversion $X_{NOx}$:

$$X_{NOx} = (c_{NOx,0} - c_{NOx})/c_{NOx,0}$$

where
$C_{NOx,0}$ raw $NO_x$ emissions, ppm;
$C_{NOx}$: $NO_x$ emissions after the catalyst, ppm.

If, to form $NO_2$, a platinum-containing $NO_x$ oxidation catalyst is installed upstream of the SCR catalyst:

$$2NO + O_2 \Leftrightarrow 2NO_2 \quad (6)$$

then the SCR reaction can be greatly accelerated, and the low-temperature activity can be significantly increased.

$$NO + 2NH_3 + NO_2 \Rightarrow 2N_2 + 3H_2O \quad (7)$$

Nevertheless, in the presence of $NO_2$, it must also be expected that the emissions of nitrous oxide will also increase according to the following reaction:

$$2NH_3 + 2NO_2 + \frac{1}{2}O_2 \Rightarrow 2N_2O + 3H_2O \quad (8)$$

In the case of internal combustion engines operating in motor vehicles it is difficult to use the SCR method to lower the nitrogen oxides, because the operating conditions are always changing. For example, the exhaust gas temperatures, the quantities of exhaust gas, and the raw $NO_x$ emissions are subject to frequent fluctuations. This makes it difficult to add the proper quantities of the reducing agent. On the one hand, the goal is to achieve the highest possible conversion of nitrogen oxides, but at the same time care must be taken not to allow the emission of nitrous oxide, isocyanic acid, or unconsumed ammonia.

To meter the reducing agent for the SCR method in motor vehicles, there are currently two different ways in which the correct metered quantity of reducing agent is determined.

The first is a pure open-loop control method without any feedback for determining the actual emissions downstream of the catalyst system. The metered quantity is determined in this case with the help of models based on data which are acquired and/or stored in the memory of an electronic engine control device of the internal combustion engine in the form of tables, curves, characteristic diagrams, or functions and possibly with the help of sensors for determining the catalyst temperature and the quantities of $NO_x$ and exhaust gas. The raw emissions of the engine are calculated, for example, from the injected quantity, the engine rpm's, the injection pressure, and fuel/air ratio, etc. The possible $NO_x$ conversions and the metered quantities of reducing agent required to achieve them depend in turn on the catalyst temperature, on the raw $NO_x$ emissions, on the quantity of exhaust gas, etc. The actual emissions downstream of the system are not detected and thus have no effect on the metered quantity (DE 43 15 278 A1, DE 195 36 571 A1, DE 199 06 344 A1, EP 898 061 A1).

A disadvantage of this method is that, because of the absence of feedback concerning the actual emissions, it is almost impossible to compensate for errors, defects, or environmental influences.

The second possibility is a standard closed-loop control circuit with $NO_x$, sensors downstream of the system. For this purpose, the actual values being supplied currently by the sensors are compared with the nominal values, and the metered quantity is adjusted continuously.

Nevertheless, the problem of permanent closed-loop control consists in the inertia of the system and of the sensors and simultaneously in the highly dynamic way in which an internal combustion engine operates in a motor vehicle. For example, during an acceleration process or an increase in the load on an exhaust gas-turbocharged internal combustion engine, the $NO_x$ emissions can rise by a factor of 10 within one second. In the case of naturally-aspirated engines, the rise occurs even faster because of the lack of inertia of the exhaust gas turbocharger. The same is also true when loads are shed or on the transition to operation in push mode.

The sensors used to determine the emissions are not able to detect these highly dynamic processes. One of the reasons for this is the inertia of the sensors. The typical t90 time, that is, the time at which 90% of the end value is reached, of these sensors is found in the range of 300-500 ms. Another reason is the necessity to position the sensors behind the catalyst system. Thus the gas transit time from the discharge point from the cylinder head to the discharge point from the catalyst system alone is in the range of 200-2,000 ms, depending on the volume flow rate of the exhaust gas and the volume of the exhaust gas system.

One possibility of partially solving this problem is to add up or to integrate the nominal and actual emissions over a relatively long period of time and to adjust the metered quantity on the basis of the difference between nominal and actual (DE 101 00 420 A1).

The $NO_x$ sensors required for closed-loop control are described in JP 63038154 A, JP 10062374 A, and JP 9288084A. Common to all these sensors is their high cross-sensitivity to reducing exhaust gas components. This is especially problematic when sensors of this type are used in SCR systems, because large quantities of the strong reducing agent ammonia can be present in the exhaust gas. Because ammonia delivers a signal as strong as that of $NO_x$, it is not possible to distinguish between $NO_x$ and $NH_3$; that is, strong sensor signals can correspond to high $NO_x$ concentrations and/or to high $NH_3$ concentrations. If unconsumed ammonia is emerging downstream of the SCR catalyst, it is for this reason no longer possible to arrive at a specific $NO_x$ concentration downstream of the SCR system by closed-loop control.

SUMMARY OF THE INVENTION

The invention is based on avoiding the disadvantages of the prior art described above.

A method according to one embodiment of the invention is applied in conjunction with an exhaust gas post-treatment system for metering an ammonia-releasing reducing agent into the exhaust gas stream of an internal combustion engine installed in a motor vehicle and operating with excess air. As usual in such arrangements, the reducing agent is metered by a metering device, which is controlled by a control unit assigned to the exhaust gas post-treatment system. To reduce the nitrogen oxides, at least one SCR catalyst, serving as another component of the exhaust gas post-treatment system, is arranged in the exhaust gas stream downstream of the metering device.

The metered quantity of reducing agent—in the systems in conventional use today, this agent is usually an aqueous urea solution, but other reducing agents (ammonia or compounds which split off ammonia such as urea or ammonium formate) are also conceivable—is adjusted by the control unit on the basis of a model, which is stored in the unit and which covers all possible operating points of the internal combustion engine or of the exhaust gas post-treatment system.

In the simplest case, the "model" is a characteristic curve or a characteristic diagram, but it can also be a large number of characteristic curves or of characteristic diagrams, or it can even consist of single or multi-parametric functions, which are determined or defined with the help of a so-called "reference arrangement" and/or on the basis of theoretical considerations. The reference arrangement in the present case is an arrangement, typical for the vehicle model series in question, of an internal combustion engine and an exhaust gas post-treatment system, which can already be installed in a vehicle.

On the one hand, a metered quantity of the reducing agent is determined for a large number of operating points of the arrangement by means of measurements of the reference arrangement and/or on the basis of theoretical considerations, and on the other hand a nominal emission value is determined at each of these operating points. Each operating point is defined by the value of at least one operating parameter of the reference arrangement. The metered quantities obtained are kept on hand in the form of a model in the control units of the corresponding vehicle model series such that, from the model, a variable proportional to the metered quantity can be obtained directly or by interpolation by the control unit for all possible values which the at least one operating parameter can assume, i.e., for all operating points which can occur.

From this model, i.e., from the characteristic curves, characteristic diagrams, or functions, the control unit determines the metered quantity as a function of the at least one operating parameter of the internal combustion engine and/or of the exhaust gas post-treatment system evaluated by the control unit. The instantaneous value of the at least one operating parameter determines the associated operating point of the internal combustion engine and/or of the exhaust gas post-treatment system. In practice, what is involved here is often not just one but rather a large number of operating parameters which have an influence on the correct metered quantity of reducing agent. As a result, this multiple dependence is preferably incorporated into the model.

But because this multiple dependence is not constant but subject to change, especially to changes over time associated with the number of hours of system operation and to changes attributable to environmental influences, the metered quantity determined on the basis of the model must be subjected to a correction.

One embodiment of the invention consists in using models, i.e., data stored in a control unit in the form of tables and/or curves and/or diagrams and/or functions, to determine, with the help of variables detected by sensors such as catalyst temperature, exhaust gas flow rate, etc., the quantity of reducing agent to be metered and to add this quantity in a controlled manner, it also consists in changing, in a defined manner during certain operating phases, the metered quantity which has been determined and added under controlled conditions and which represents the starting value, and furthermore in using an $NO_x$ sensor installed downstream of the catalyst to determine the reaction of the SCR catalyst and in comparing this reaction with the reaction theoretically expected by the control unit, i.e., the reaction which would necessarily result from the change. The degree of agreement between the observed reaction and the expected reaction or, in other words, the manner in which the observed reaction deviates from the expected one, shows whether or not the SCR catalyst is being operated in the optimal range or if the $NO_x$ concentration or the $NH_3$ concentration is too high for the individual operating point in question.

It is possible, therefore, to infer the presence of $NO_x$ and/or $NH_3$ from the change in the sensor signal. In the simplest case, three ranges can be distinguished:

1. An increase in the metered quantity leads to a decrease in the sensor signal meaning that the additionally supplied quantity of reducing agent has led to the reduction of the nitrogen oxides; that is, the $NO_x$ sensor detects $NO_x$;

2. An increase in the metered quantity leads to little or no change in the sensor signal meaning the optimal operating point of the SCR system has been reached; that is, $NO_x$ and $NH_3$ are minimal; and 3. An increase in the metered quantity leads to an increase in the sensor signal meaning the SCR system is overloaded;

the additionally supplied quantity of reducing agent leads to an increase in the $NH_3$ emissions; that is, the $NO_x$ sensor detects primarily $NH_3$.

From the extent of the change in the supplied metered quantity, reaction equations (1)-(7) given above can be used by the control unit to calculate the theoretically expected value of the change in the sensor signal. Based on the type of change in the sensor signal described above, the control unit can determine whether the metered quantity should be increased or decreased in the next step or whether the optimal effectiveness of the SCR catalyst or the desired $NO_x$ quantity or concentration has been reached.

The variable used to evaluate the change can be the change in the $NO_x$ concentration, i.e., the measured value of the $NO_x$ sensor installed downstream of the SCR catalyst, but it would also be possible to use a variable derived from that such as, for example, the $NO_x$ conversion. To minimize errors in the determination of the NO conversion, it is effective to determine the raw $NO_x$ emissions by the use of an NO sensor upstream of the SCR catalyst. For cost reasons the raw $NO_x$ emission can also be determined by the use of suitable models.

The metered quantity continues to be adjusted until the comparison of the expected change with the metrologically determined change indicates that the nominal $NO_x$ emission and/or the optimal operating point of the SCR catalyst has been reached. At this optimal operating point, both the $NO_x$ exhaust gas components and the $NH_3$ exhaust gas components are at a minimum. For the determination of a correction value, the value of the metered quantity which has been reached is compared with the starting value of the metered quantity, and from that a correction value is derived. The metered quantity is adjusted by the use of this correction value. It is therefore possible in a simple and thus advantageous manner, to adjust the metered quantity to accommodate changes in the system over time or environmentally caused changes in the system, i.e., the system consisting of the internal combustion engine and the exhaust gas post-treatment arrangement.

With respect to the determination of the correction value, it is advantageous in addition to determine the value of at least one operating parameter with which the system of internal combustion engine and exhaust gas post-treatment arrangement is currently being operated and to store the correction value together with the value of the at least one operating parameter, linked together, in the control unit. This leads in an advantageous manner to the possibility of applying the correction of the metered quantity at a later time as a function of the operating parameter. For this purpose, the control unit uses the associated metered quantity, which is kept available in the control unit's memory in the form of a model, and the correction value which is associated with the operating parameter and is also stored in the control unit's memory, to determine the correct metered quantity as a function of the actual value of the at least one associated operating parameter.

The operating parameters with which the correction values are linked and stored in the control unit's memory can advantageously be the coolant temperature and/or the oil temperature and/or the fuel temperature and/or the fuel injection pressure and/or the intake air temperature and/or the charging air temperature and/or the turbocharger rpm's and/or the charging pressure and/or the air mass and/or the exhaust gas mass and/or the driving speed and/or the engine rpm's and/or the quantity of fuel injected and/or the exhaust gas temperatures and/or the catalyst temperature and/or the quantity of reducing agent injected and/or the exhaust gas return rate and/or the exhaust gas mass flow and/or the reducing agent pressure and/or the number of hours of operation and/or the humidity and/or the atmospheric pressure and/or the raw $NO_x$ emission.

Different correction values can be determined and stored for different operating parameters and/or for different values of the operating parameters.

An operating parameter-based correction requires, first, that the value of the operating parameter must remain constant during the process of determining the correction value, that therefore the arrangement of the internal combustion engine and the exhaust gas post-treatment system must be operating under steady-state conditions. Second, it requires that a large number of correction values must be determined.

The totality of the correction values can be stored in the control unit in the form of characteristic curves, characteristic diagrams, or single- or multi-parametric correction functions in analogy, therefore, to the metered quantities kept available in the model. To achieve an advantageous decrease in the number of correction values to be determined and stored, it is possible to use correction values stored for adjacent operating parameter values to determine correction values mathematically, by linear interpolation, for operating parameter values lying between the stored ones.

To compensate advantageously for the inertia of the $NO_x$ sensors in particular, the actual sensor values required for determining the reaction of the SCR catalyst or variables derived from them such as the actual $NO_x$ conversions can be added up and/or integrated over a previously specified period of time.

It is also possible to divide the operating parameters into value ranges or classes in a preceding process and to determine correction values during operation as a function of these classes and to apply them to all operating parameter values within the class in question. Though the choice of value ranges within which the at least one operating parameter may shift, it is possible to keep the error which results from this class formation to a negligible order of magnitude. In other words: the setting of the value range is done in such a way that the operating parameter can be considered to be in a more-or-less steady state within the value range, i.e., within the class. In this way, it is possible, first, to achieve a drastic and thus advantageous reduction in the number of correction values required, and second, it is possible to determine the correction values much more frequently, which is also advantageous, because the operating parameters may be allowed to vary within the value ranges or classes during the determination of the correction values.

Each relevant operating parameter used for the correction comprises at least two value ranges or classes. The value ranges, as already explained, are selected so that the error in the determination of the correction value caused by the variation of the operating parameter value is negligible.

If the actual operating point of the system leaves an operating parameter class during the determination of a correction value, there are two alternative approaches which can be taken: According to a first approach, the process can be interrupted at this point, and the result achieved up until then can be stored on an interim basis. The determination of the correction value is resumed when the actual operating point of the system returns to this operating parameter class. The process can be repeated as many times as necessary until the correction value is determined. In particular, the addition or integration of the actual sensor value and/or of the actual $NO_x$ conversion can be interrupted, and the value achieved up until then can be stored on an interim basis, whereupon the addition or integration can be resumed again when the actual operating point of the system returns to the corresponding class of operating points.

According to the second approach, it is possible, when the actual operating point of the system leaves a class of operating parameters while a correction value is being determined, to interrupt the determination process and to discard the results achieved up until that point. In particular, the addition or integration of the actual sensor value and/or of the actual $NO_x$ conversion can be interrupted and the sum determined up until that point can be discarded.

Both alternatives have their advantages and disadvantages. In the first case, it is possible, at least theoretically, for days or even weeks to go by until the process of determining a correction value is completed, as a result of which time-related influences or environmental influences can exert their effects, which could falsify the measurement result. This can be countered by limiting the period of time during which interim stored values are considered valid. When the method making use of interim storage is used, it advantageous that the frequency at which actual correction values are made available is greatly increased. In the second case, it is ensured that a correction value determination occurs "at one go", i.e., only seconds lie between the beginning and end of the process. In such short time periods, time-related influences or environmental influences do not play any role and therefore have no effect on the determination of the correction value. On the other hand, the frequency at which actual correction values are made available is significantly decreased.

The operating parameters used to determine a constant or class-based quasi-constant operating state can advantageously be the cooling water temperature and/or the oil temperature and/or the fuel temperature and/or the fuel injection pressure and/or the intake air temperature and/or the charging air temperature and/or the turbocharger rpm's and/or the charging pressure and/or the driving speed and/or the engine rpm's and/or the quantity of fuel injected and/or the exhaust gas temperatures and/or the catalyst temperature and/or the quantity of reducing agent injected and/or the exhaust gas return rate and/or the reducing agent pressure and/or the emissions and/or the fuel/air ratio and/or the change in these variables over time.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in greater detail below on the basis of exemplary embodiments in conjunction with the drawing.

DETAILED DESCRIPTION OF THE PRESENTLY PREFERRED EMBODIMENTS

The following discussion is based on an exhaust gas post-treatment system for metering a reducing agent which splits off ammonia into the exhaust gas stream of, e.g., an internal combustion engine installed in a motor vehicle. It is also assumed that the sensor installed in the exhaust gas post-treatment system downstream from a SCR catalyst detects the quantity of $NO_x$ present in the exhaust gas but also comprises a certain sensitivity for $NH_3$.

Figure 1:
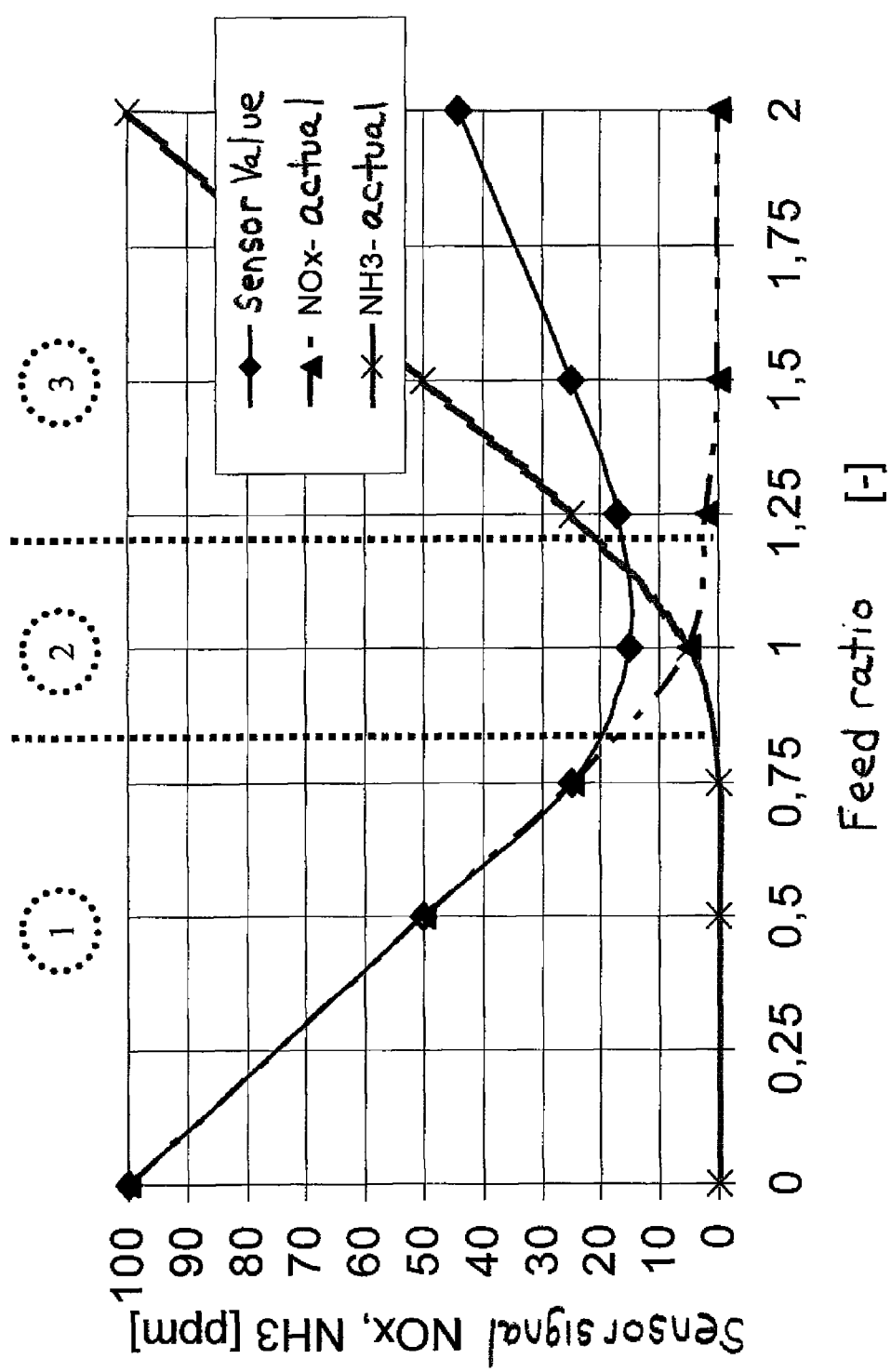
FIG. 1 is a first graph, which illustrates the sensor signal as a function of the feed ratio.

The graph according to FIG. 1 shows the sensor signal as a function of the feed ratio, that is, the ratio between $NH_3$ and $NO_N$. Because one mole of $NH_3$ is required to reduce one mole of $NO_N$, in the ideal case, an increase in the quantity of $NH_3$ would necessarily lead to an equivalent decrease in the emissions of $NO_x$. This behavior can be seen in range 1 of FIG. 1. The expected value resulting from the change in the feed ratio, i.e., from the change in the quantity of reducing agent, and the sensor signal are nearly identical. The sensor value is above the expected value, as it is in ranges 2 and 3, then $NH_3$ is also present along with the $NO_x$, or possibly $NH_3$ exclusively is present. Ammonia slip can thus occur even considerably below the optimal operating point.

Figure 3:
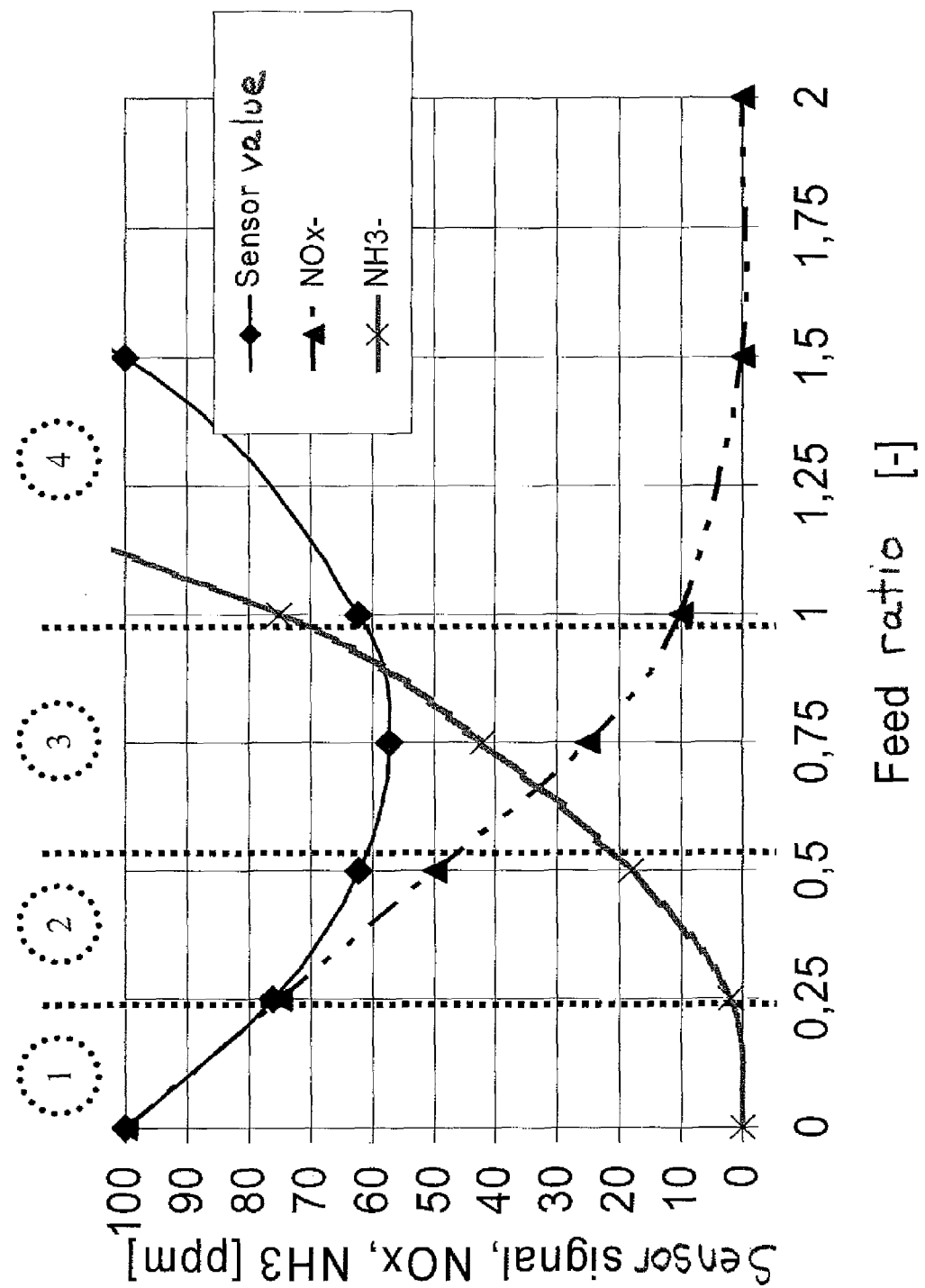
FIG. 3 is a second graph, which illustrates the sensor signal as a function of the feed ratio.

The inventive method according to one embodiment would react to a decrease in the efficiency of the system, as expressed by this increase in the sensor signal, by changing the quantity of reducing agent supplied. There are four ranges to be distinguished here, as illustrated in the graph of FIG. 3.

1. An increase in the metered quantity leads to a decrease in the sensor signal meaning that the additionally supplied quantity of reducing agent has led to the reduction of the nitrogen oxides, that is, the $NO_x$ sensor detects $NO_x$ exclusively. Accordingly, the metered quantity for achieving a desired conversion or a desired $NO_x$ emission level can be increased even more; that is, the correction value can be increased.

2. Although an increase in the metered quantity leads to a decrease in the sensor signal, this does not correspond to the expected reduction. In addition to the $NO_x$, an $NH_3$ component is also being measured now, which leads to a flattening of the curve. The transition from range 1 to range 2 can therefore be referred to as the optimal operating point; that is, the correction value should not be changed any further.

3. An increase in the metered quantity does not lead to any change in the sensor signal, because the decrease in $NO_x$ is compensated by the emission of $NH_3$. The optimal operating point is exceeded; the metered quantity and therefore the correction value must be decreased.

4. An increase in the metered quantity leads to an increase in the sensor signal. The SCR system is overloaded; the additionally supplied quantity of reducing agent leads to an increase in the $NH_3$ emissions. That is, the $NO_x$ sensor detects primarily $NH_3$. The metered quantity and thus the correction value must be decreased.

After it has been determined in this way whether the sensor signal involves $NO_x$, $NO_x+NH_3$, or only $NH_3$, that is, in what range of the conversion curve the catalyst is working at that particular moment, the metered quantity can be adjusted via the at least one correction value in such a way that a nominal conversion or a nominal $NO_x$ emission or an optimal $NO_x$ conversion is obtained. This correction value is stored in the memory of an electronic control unit and serves in the following metering processes to correct the pilot-control values for the metered quantity derived from the models.

The metered quantity actually added, $m_{reducing\ agent}$, at time t is thus obtained from a metered quantity $m_{reducing\ agent,\ model}$ determined from models in the form of stored data such as curves, diagrams, tables, or functions and at least one correction value K, which was determined at an earlier point in time (t').

In general:

$$m_{reducing\ agent}(t) = K(t') \cdot m_{reducing\ agent,model},$$

where t is the actual time, t' is a time in the past, and $m_{reducing\ agent,\ model}$ is the quantity of reducing agent taken from the model.

It is also advantageous to determine the correction value during operating phases in which the emissions used to determine the correction values, i.e., the changes in those emissions caused by changing the metered quantity, can be determined with sufficient accuracy. These are the operating phases in which the exhaust gas post-treatment system and/or the internal combustion engine are as close to a steady state as possible, so that the time lags of the sensors and/or the inertia of the system no longer has any effect on the determination of the actual emissions and/or of the parameters of influence.

To establish that the internal combustion engine and/or the catalyst system is operating in a steady state, it can be effective to use, as evaluation criteria, the cooling water temperature and/or the oil temperature and/or the fuel temperature and/or the fuel injection pressure and/or the intake air temperature and/or the charging air temperature and/or the turbocharger rpm's and/or the charging pressure and/or the air mass and/or the exhaust gas mass and/or the driving speed and/or the engine rpm's and/or the quantity of fuel injected and/or the exhaust gas temperatures and/or the catalyst temperature and/or the quantity of the reducing agent injected and/or the exhaust gas return rate and/or the reducing agent pressure and/or the emissions and/or the fuel/air ratio and/or the change over time in these variables. In practice, not all of the previously mentioned variables or operating parameters will be used to determine the presence of a steady operating state; instead, preferably a comparatively small number of system-related, relevant operating parameters will be chosen.

During the operation of vehicles in which there is a constant change between acceleration processes and deceleration processes, such as in the case of city driving, the time period between inspections of the emissions and thus between the revisions of the correction value can be in the range of 30-60 minutes. To make possible a more frequent inspection and simultaneously to detect the system response to changed quantities of reducing agent as accurately as possible, it is conceivable that the nominal and actual sensor values and/or nominal and actual conversions and/or nominal and actual changes could be added up or integrated over a relatively long period of time. This has the effect of minimizing the short-term fluctuations of the operating parameters and/or the noise of the sensor values, which could lead to an incorrect determination of the correction value K.

As previously explained, the determination of only a single, global correction value is not sufficient, because the achievable conversions of the SCR catalyst depend on several operating parameters—also referred to in the following as "parameters of influence E"—which describe different operating states of the internal combustion engine and/or of the post-treatment system. Conceivable parameters of influence are the cooling water temperature and/or the oil temperature and/or the fuel temperature and/or the fuel injection pressure and/or the intake air temperature and/or the charging air temperature and/or the turbocharger rpm's and/or the charging pressure and/or the air mass and/or the exhaust gas mass and/or the driving speed and/or the engine rpm's and/or the quantity of fuel injected and/or the exhaust gas temperatures and/or the catalyst temperature and/or the quantity of reducing agent injected and/or the exhaust gas return rate and/or the exhaust gas mass flow and/or the reducing agent pressure and/or the number of hours of operation and/or the humidity and/or the atmospheric pressure and/or the raw $NO_x$ emissions.

So that the entire operating range of the internal combustion engine and/or of the post-treatment system can be covered, different correction values are determined for different values of these parameters of influence. These can be stored in the form of tables but also as characteristic curves (single-parameter correction functions) and/or characteristic diagrams (two-parameter correction functions) and/or multi-parameter functions in the control unit of the system, wherein, for the determination of the actual correction values, it is possible to interpolate between these different correction values during system runtime, that is, during operation.

The metered quantity $m_{reducing\ agent}$ actually added at time t is then derived from a metered quantity $m_{reducing\ agent,\ model}$ determined from stored data in the form of curves, tables, or functions, and at least one correction value $K_E$, which is linked to a parameter of influence E and which was determined at time t'.

In general:

$$m_{reducing\ agent}(t) = K_E(t') \cdot m_{reducing\ agent,model}$$

where t is the actual time and t' is a time in the past.

For the determination of the effect of different values of the parameter of influence, it is necessary to determine the deviation between nominal and actual emissions or between nominal and actual conversions in the case of at least two different values for the parameter of influence and thus at two different times in the past. As already described above, it is advantageous to determine the correction values while the post-treatment system and/or the engine is operating under steady-state conditions.

By way of example, the method for using different correction values for different magnitudes of a parameter of influence will be described for the parameter of influence "exhaust gas mass flow":

When the inspection is run during steady-state operation, a correction value of 120% is determined at an exhaust gas mass flow of 1,000 kg/h;
 a correction value of 90% is obtained at 2,000 kg/h; and
 a correction value of 130% is obtained at 3,000 kg/h.

The correction values thus determined are plotted in the form of a characteristic curve and assigned to the exhaust gas mass flows 1,000 kg/h, 2,000 kg/h, and 3,000 kg/h:

| exhaust gas mass flow (kg/h) | 1,000 | 2,000 | 3,000 |
|---|---|---|---|
| correction value (%) | 120 | 90 | 130 |

During non-steady-state operation of the engine, the actual correction value at the time in question can then be determined, preferably by linear interpolation, from the characteristic curve and used to adjust the metered quantity controlled on the basis of the model. For example, for an actual exhaust gas mass flow of 1,500 kg/h, a correction value of 105% would be obtained, by which the metered quantity would then be corrected.

The correction values can be determined and stored in the form of relative values as described above or in the form of absolute values such as changed reducing agent mass flow rates.

The same method can be applied analogously to the determination of the correction values for the other parameters of influence.

If n parameters of influence $E_1$ to $E_n$ are obtained, then, for n correction values, the actually added metered quantity can be determined by multiplication:

$$m_{reducing\ agent}(t) = K_1(E_1(t')) \cdot K_2(E_2(t'')) \cdot K_3(E_3(t''')) \cdot \ldots K_n(E_n(t''''))\cdot m_{reducing\ agent\ model}$$

or by addition:

$$m_{reducing\ agent}(t) = K_1(E_1(t')) + K_2(E_2(t'')) + K_3(E_3(t''')) + \ldots K_n(E_n(t'''')) + M_{reducing\ agent\ model}$$

of the correction values.

Addition of the correction values is preferably done when the correction values are absolute values. Multiplication is preferably done when the correction values contain relative values.

Another possibility is to set up a multi-parameter correction function K, in which the parameters of influence $E_1$ to $E_n$ are contained:

$$m_{reducing\ agent}(t) = K(E_1(t'), E_2(t''), E_3(t''') \ldots E_n(t''''))\cdot m_{reducing\ agent\ model}$$

The individual correction values for the parameters of influence can but do not have to have been determined at different times t', t", t''', etc.

The correction values continue to be kept "frozen" or fixed and used for correction of the model values and thus for control until a new inspection of the emissions can be conducted and new correction values can be determined.

Figure 2:
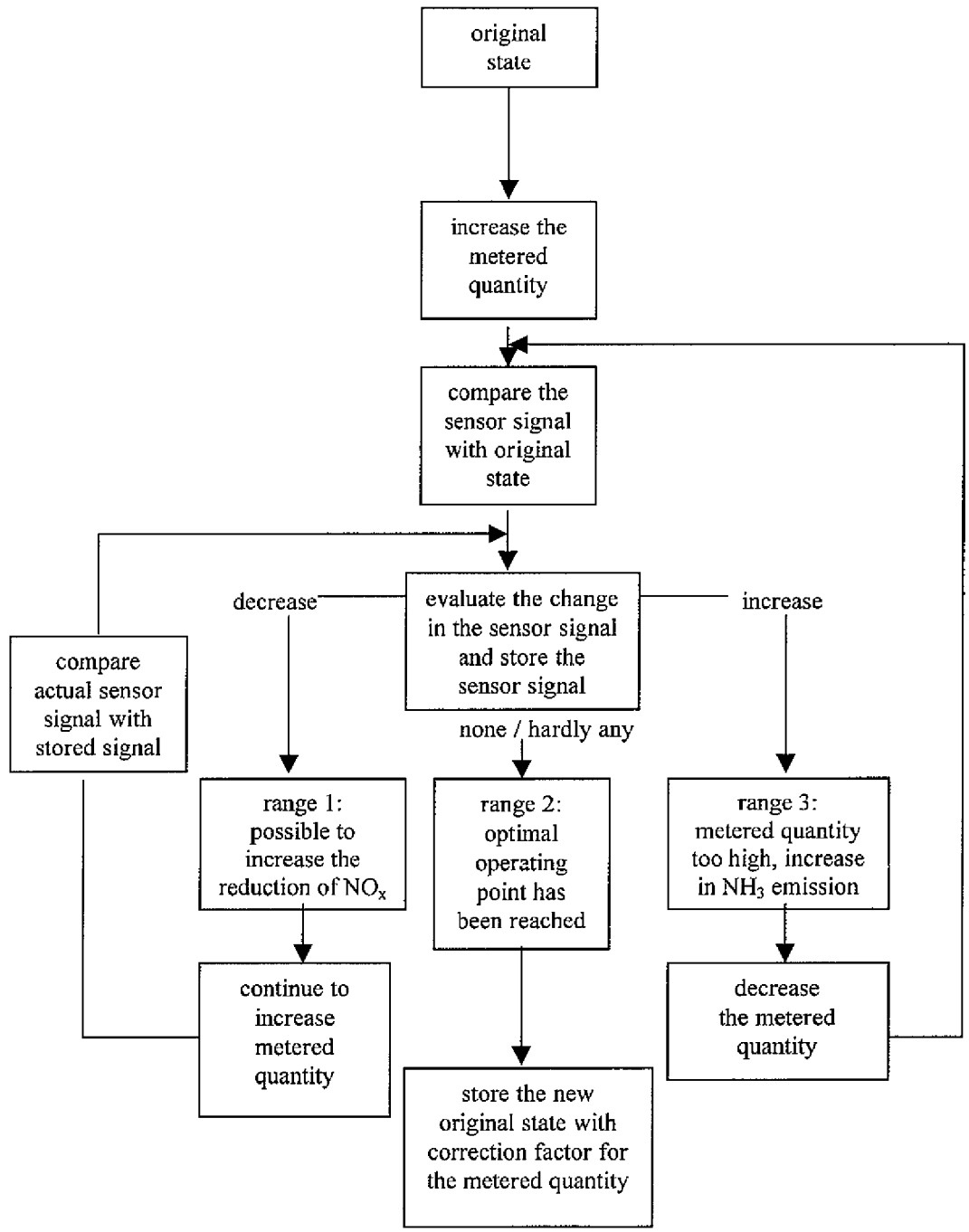
FIG. 2 is a flow chart, which, explains the procedure of FIG. 1.

FIG. 2 is a flow chart of the control steps for determining a correction value. As already explained, the sequence of steps shown by way of example is conducted while the internal combustion engine is operating in a steady state. The sequences of steps for establishing the presence of a steady operating state, however, are not indicated in the flow chart. A "steady operating state" is understood to mean that the essential parameters of influence or the operating parameters acting on the internal combustion engine are not undergoing significant schanges. The presence of a steady operating state is established by monitoring said parameters of influence by the control unit. The previously mentioned sequences of steps are performed via control sequences implemented in the control unit as control programs, where the previously mentioned control sequences are parts of higher-level control sequences. Control units of the type in question are components of all modern internal combustion engines.

First, the metered quantity is increased from that present in an original state, and then the actual sensor signal is compared with that of the original state. The change in the actual sensor signal versus the original state is, in a next step, evaluated by the control unit, and simultaneously the value of the actual sensor signal is stored. This evaluation can lead any one of three different results:

1. An increase in the metered quantity leads to a decrease in the sensor signal. As also in the case of FIG. 1, the exhaust gas post-treatment system is operating in range 1. This means that the additionally supplied quantity of reducing agent has led to a reduction of the nitrogen oxides, that is, the $NO_x$ sensor detects $NO_N$.

2. An increase in the metered quantity leads to little or no decrease in the sensor signal (corresponding to range 2 in FIG. 1). The optimal operating point of the SCR system has been reached; that is, $NO_x$ and $NH_3$ are minimal.

3. An increase in the metered quantity leads to an increase in the sensor signal (corresponding to range 3 in FIG. 1). The SCR system is overloaded; the actually supplied quantity of reducing agent leads to an increase in the $NH_3$ emissions; that is, the $NO_x$ sensor detects primarily $NH_3$.

Proceeding from the possible results of the evaluation listed above, three alternative methodologic approaches are required. If the exhaust gas post-treatment system is in range 1, the control unit increases the metered quantity by a predefined amount in the next step. Then the actual sensor signal is compared with the stored sensor signal, and the change in the sensor signal is evaluated again or the actual sensor signal is stored. If the nominal $NO_x$ value or the nominal $NO_x$ conversion had already been reached before the inspection, no correction by adjusting the correction value is necessary. If the nominal $NO_x$ value or the nominal $NO_x$ conversion had not been reached yet, an adjustment by changing the correction value can take place.

If the exhaust gas post-treatment system is in range 3, the control unit decreases the metered quantity by a predefined amount in the next step. Then the actual sensor signal is compared with the original state, and the change in the sensor signal is evaluated again or the actual sensor signal is stored.

If the exhaust gas post-treatment system is in range 2, the optimal operating point has been reached, and the control unit determines the difference between the metered quantity according to the original state and the actual metered quantity, adopts this as the correction value, and stores this value together with the new original state.

Figure 4:
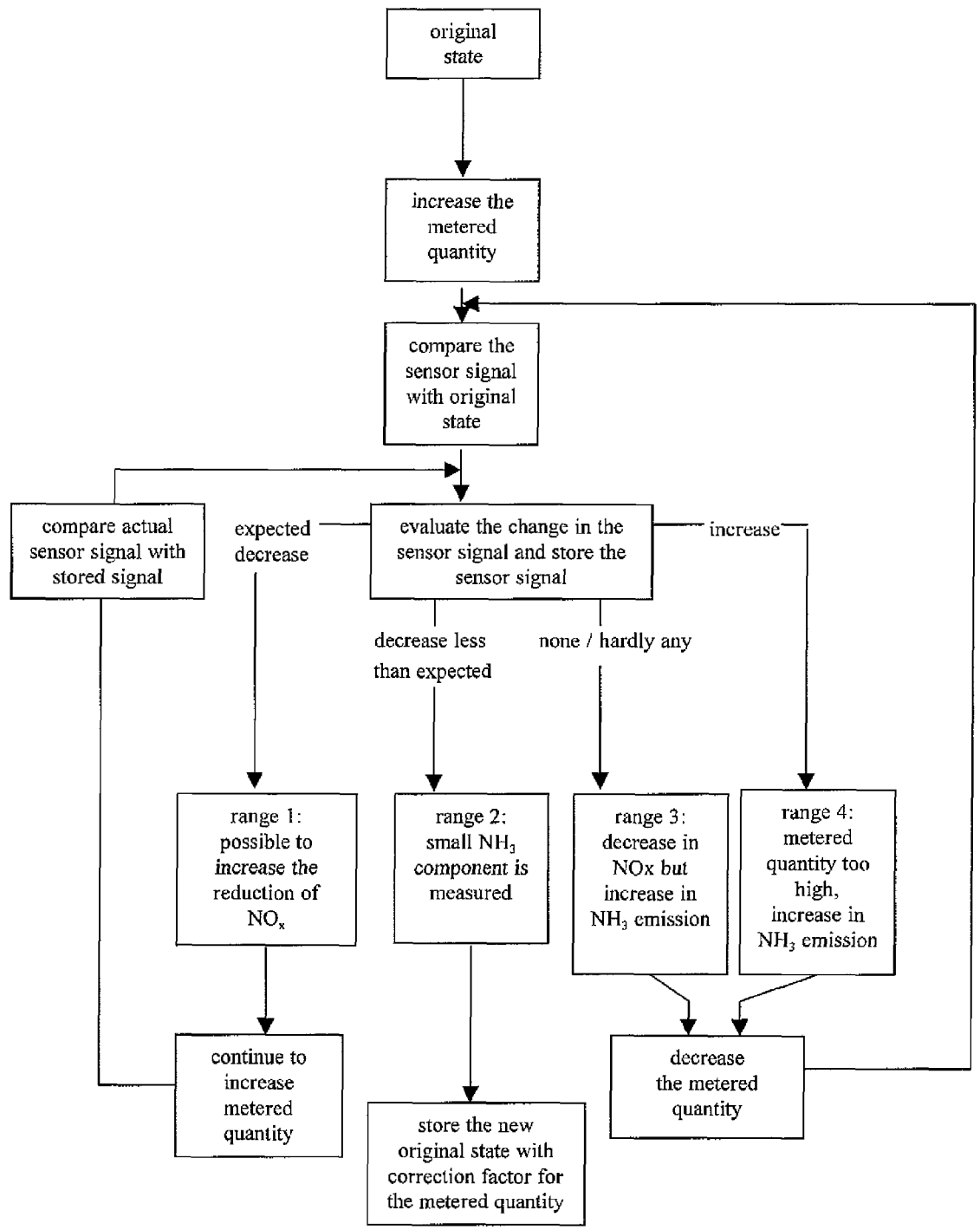
FIG. 4 is a flow chart which, explains the procedure of FIG. 3.

FIG. 4 is another flow chart, which is the same in principle as that of FIG. 2, except that the evaluation of the change in the sensor signal is carried out in a more differentiated manner to arrive at the optimal operating point more effectively. This control sequence, shown by way of example, is also conducted during the presence of a steady operating state of the internal combustion engine. First, the metered quantity is increased from that present in an original state, and then the actual sensor signal is compared with that of the original state. In the next step, the control unit evaluates the change in the actual sensor signal versus the original state, and simultaneously the value of the actual sensor signal is stored. The evaluation can lead to any one of four different results:

1. An increase in the metered quantity leads to a decrease in the sensor signal (corresponding to range 1 in FIG. 3). This means that the additionally supplied quantity of reducing agent has led to a reduction of the nitrogen oxides; that is, the $NO_x$ sensor detects exclusively $NO_x$. Accordingly, the metered quantity can be increased even more to achieve a desired conversion; that is, the correction value can be increased.

2. Although an increase in the metered quantity leads to a decrease in the sensor signal, this does not correspond to the expected reduction (corresponding to range 2 in FIG. 3). This means that, in addition to the $NO_x$ emission, an $NH_3$ component is also measured, which leads to a flattening of the curve. The transition from range 1 to range 2 can therefore be referred to as the optimal operating point, because here, at maximum $NO_x$ conversion, there is still no $NH_3$ slip. The correction value should therefore not be changed.

3. An increase in the metered quantity does not lead to any change in the sensor signal (corresponding to range 3 in FIG. 3). This means that the lowering of $NO_x$ is compensated by the emission of $NH_3$. The optimal operating point has been exceeded; the metered quantity and therefore the correction value must be decreased.

4. An increase in the metered quantity leads to an increase in the sensor signal (corresponding to range 4 in FIG. 3). The SCR system is overloaded; the additionally supplied quantity of reducing agent leads to an increase in the $NH_3$ emissions; that is, the $NO_x$ sensor detects primarily $NH_3$. The metered quantity and therefore the correction value must be decreased.

Proceeding from the possible results of the evaluation described above, we find that four alternative methodologic approaches are required. If the exhaust gas post-treatment system is in range 1, the control unit increases the metered quantity in the next step by a predefined amount. Then the actual sensor signal is compared with the stored sensor signal, and the change in the sensor signal is evaluated again or the actual sensor signal is stored. If the nominal $NO_x$ value or the nominal $NO_x$ conversion has already been reached before the inspection, there is no need for a correction by adjusting the correction value. If the nominal $NO_x$ value or the nominal $NO_x$ conversion has not yet been reached, an adjustment can be made by changing the correction value.

If the exhaust gas post-treatment system is in range 3 or range 4, the control unit decreases the metered quantity in the next step by a predefined amount. Then the actual sensor signal is compared with the original state, and the change in the sensor signal is evaluated again or the actual sensor signal is stored.

If the exhaust gas post-treatment system is in range 2, the optimal operating point has been reached; the control unit determines the differences between the metered quantity according to the original state and the actual metered quantity, adopts this as the correction factor, and stores it together with the new original state.

Figure 5:
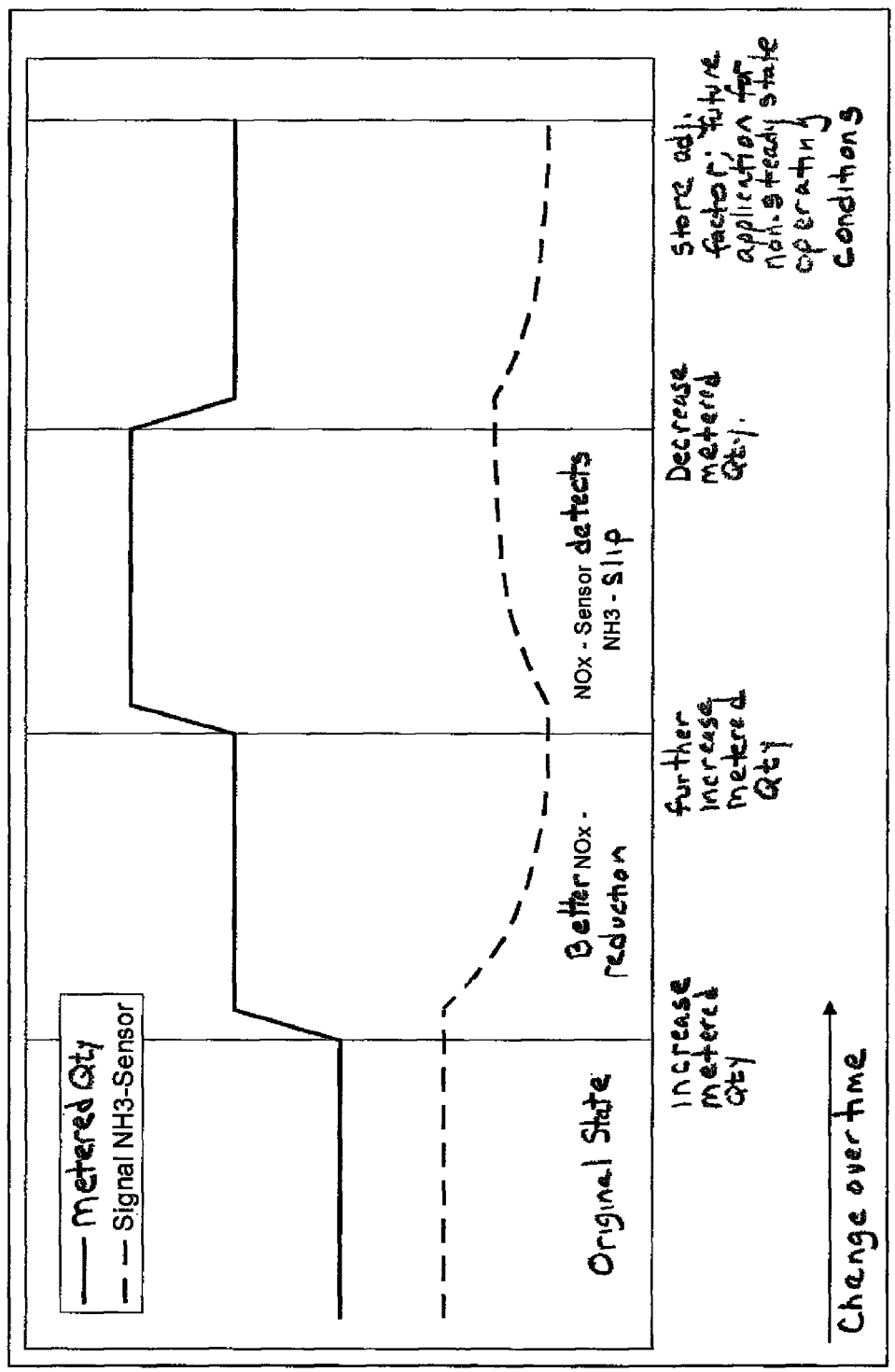
FIG. 5 is a graph of an example of a time curve for determining a correction value for the metered quantity of reducing agent.

FIG. 5 shows by way of example the change over time in the metered quantity and the response of the $NO_x$ sensor.

The original state is changed by an increase in the metered quantity. As a result of the larger quantity of injected reducing agent, better $NO_x$ reduction is achieved; this is expressed at the $NO_x$ sensor by a drop in the signal. A further increase in the metered quantity, however, does not lead to any further decrease in the $NO_x$ signal, because this starts to increase again as a result of the detected $NH_3$. The last value is therefore discarded; the previous value of the metered quantity, which led to a reduction of the nitrogen oxides, is used and can also be applied to future points in time even in the non-steady-state range. To derive a correction value from the corrected metered quantity thus found, the found metered quantity can be subtracted from the metered quantity according to the original state; the difference corresponds to the correction value.

Of course, the correction value can also be formed by adding up the absolute or relative values of the changes in the metered quantity versus the original state.

The found correction value is then stored by the control unit in the same way as described above and used at later times to adjust the metering of the reducing agent.

As already described above, the inspections should be performed in a steady operating state of the system. If this is not possible, an integration or addition of the nominal and actual values over a relatively long period of time can be done as previously mentioned.

As another possibility of determining the correction value, we have already described above the class-based determination of correction values. For this purpose, the values which the relevant operating parameters can assume are divided into value ranges or classes during a preceding period of time, e.g., with the help of a previously described reference arrangement. The value ranges are selected so that the error caused by the variation of the operating parameter value is negligible with respect to the determination of the correction value. The value ranges or classes thus determined for each of the relevant operating parameters are stored in the control units of the series, so that they are available for later use.

Only one correction value is determined for each of the stored value ranges, wherein the value of the operating parameter being considered may vary only within the value range during the correction value determination. The correction value thus determined is then used for all operating parameter values which lie within the value range, i.e., within the class.

By way of example, the method of classes is described in the following table using the exhaust gas mass flow as an example:

| exhaust gas mass flow (kg/h) | 100-1,000 | 1,001-2,000 | 2,001-3,000 |
|---|---|---|---|
| correction value (%) | 120 | 90 | 130 |

The example shows that, for the range of 100-3,000 kg/h, only the correction values need to be determined. This is relatively simple, because in most cases a correction value determination can be completed before the operating parameters or parameters of influence—in the present case the "exhaust gas mass flow"—leaves the class.

During non-steady-state operation of the engine, the determined correction value can then be applied either to the entire span of the class or to only one value of the class, such as the lower limit, the middle, or the upper limit, wherein the actual correction value is determined from the characteristic curve—advantageously by linear interpolation—and used to adjust the controlled metered quantity.

For the first case, we would obtain, for mass flows between 1,001 and 2,000 kg/h, a constant correction value of 90%, by which the metered quantity determined from the models would be corrected by multiplication by the correction value. From 2,001 kg/h on, the metered quantity would be corrected by 130%.

In the other case, a correction value of 102% would be obtained by linear interpolation for an exhaust gas mass flow of 1,800 kg/h, under the assumption that the previously determined correction value is related to the mid point between the two nearest correction classes.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested forth or embodiment as a general matter of design choice. It is the intention, therefore, to be limited only as indicated by the scope of the claims appended hereto.

We claim:

1. A method for metering an ammonia-releasing reducing agent into an exhaust gas stream of an internal combustion engine in an exhaust gas post-treatment system operated with excess air, comprising at least one SCR catalyst installed in the exhaust gas stream downstream of a metering device, the method comprising:
   metering the reducing agent into the exhaust gas stream by the metering device that is controlled by a control unit of the exhaust gas post-treatment system;
   determining a metered quantity of the reducing agent added under controlled conditions by the control unit based at least in part on a model that includes a plurality of operating points of at least one of the internal combustion engine and the exhaust gas post-treatment system as a function of at least one operating parameter of at least one of the internal combustion engine and the exhaust gas post-treatment system, the at least one operating parameter being evaluated by the control unit, wherein an instantaneous value of the at least one operating parameter determines the associated operating point of the at least one of the internal combustion engine and the exhaust gas post-treatment system;
   varying the metered quantity during operating phases of the at least one of the internal combustion engine and the exhaust gas post-treatment system;
   measuring a value of $NO_x$ by at least one $NO_x$ sensor installed downstream of the SCR catalyst;
   determining a magnitude of variation of the measured value of $NO_x$;
   comparing the measured value of $NO_x$ with an expected value of $NO_x$ determined by the control unit from the determined magnitude of the variation;
   determining a presence of at least one of $NO_x$ and $NH_3$ based at least in part on a correlation between the expected value and the determined value of the $NO_x$;
   varying the metered quantity until at least one of:
      a nominal $NO_x$ concentration has been reached,
      a nominal $NO_x$ conversion derived from the nominal $NO_x$ concentration has been reached,
      a deviation of an actual value of $NH_3$ from an expected value of $NH_3$ is present, and
      a sum of $NO_x$ and $NH_3$ have reached one of a minimum value and a predefined value;
   determining at least one correction value based at least in part on the metered quantity of the reducing agent prior to the variation of the metered quantity of the reducing agent and from the metered quantity of the reducing agent upon achievement of the at least one of the nominal $NO_x$ concentration, the nominal $NO_x$ conversion, upon establishment of the presence of $NH_3$, and upon achievement of the minimum or predefined value of the sum of $NO_x$ and $NH_3$;
   storing the determined correction value in a memory of the control unit;
   adjusting the metered quantity of the reducing agent by the determined correction value for subsequent metering processes;
   determining the value of the at least one operating parameter for the determination of the correction value;
   storing the determined value of the at least one operating parameter with the determined correction value in the memory of the control unit; and
   adjusting the metered quantity of the reducing agent based at least in part on the determined value of the at least one operating parameter.

2. The method according to claim 1, wherein the at least one operating parameter is one of:
   a coolant temperature,
   an oil temperature,
   a fuel temperature,
   a fuel injection pressure,
   an intake air temperature,
   a charging air temperature,
   a turbocharger rpm's,
   a charging pressure,
   an air mass,
   an exhaust gas mass,
   a driving speed,
   an engine rpm's,
   a quantity of fuel injected,
   an exhaust gas temperature,
   a catalyst temperature,
   the quantity of reducing agent injected,
   an exhaust gas return rate,
   an exhaust gas mass flow,
   a reducing agent pressure,
   a number of hours of operation,
   a humidity,
   an atmospheric pressure, and
   a raw $NO_x$ emission.

3. The method according to claim 1, wherein the control unit determines different correction values for different operating parameters and stores the determined different correction values with associated operating parameters.

4. The method according to claim 3, wherein
   the control unit stores the determined different correction values in the form of at least one of an at least one characteristic curve, at least one characteristic diagram, and at least one single or multi-parametric correction function; and
   the correction values for subsequent metering processes are based at least in part on the at least one of the at least one characteristic curve, the at least one characteristic diagram, and the at least one single or multi-parametric correction function as a function of the value of one or more operating parameters.

5. The method according to claim 1, further comprising one of adding up and integrating, over a predefined period of time, one of the output signal of the $NO_x$ sensor and a variable derived from the output signal of the $NO_x$ sensor to determine the actual sensor value.

6. The method according to claim 1, wherein the at least one operating parameter is divided into class-forming value ranges, and the determination of the at least one correction value is based at least in part on these classes.

7. The method according to claim 6, wherein, if the value of the at least one operating parameter leaves its class during the determination of a correction value, the partial results obtained are stored, and the process of determining the correction value is resumed with the stored partial results when the value of the at least one operating parameter reenters the class.

8. The method according to claim 6, wherein, when the value of the at least one operating parameter leaves its class during the determination of a correction value, the partial results obtained are discarded.

9. The method according to claim 1, wherein the metered quantity of reducing agent is varied while one of the internal combustion engine and the catalyst system is operating under steady state conditions.

10. The method according to claim 8, wherein, to establish that a steady operating state is present, at least one variable of a coolant temperature, an oil temperature, a fuel temperature, a fuel injection pressure, an intake air temperature, a charging air temperature, a turbocharger's rpm, a charging pressure, a driving speed, an engine's rpms, a quantity of fuel injected, an exhaust gas temperature, a catalyst temperature, a quantity of reducing agent injected, a exhaust gas return rate, a reducing agent pressure, emissions, a fuel/air ratio, and changes in these variables is used.

11. The method according to claim 1, further comprising generating a correction value by interpolation by the control unit from correction values which have been stored for adjacent operating parameter values, or using a correction value assigned to an operating parameter value adjacent to the actual operating parameter values, when no correction value has been stored for the actual operating parameter value.

12. The method of claim 1, wherein the control unit is assigned to the exhaust gas post-treatment system.

13. The method according to claim 1, wherein the control unit determines different correction values for different values of the operating parameters and stores different correction values with the associated operating parameters.

* * * * *